(12) United States Patent
Niikawa et al.

(10) Patent No.: US 6,704,053 B1
(45) Date of Patent: Mar. 9, 2004

(54) DIGITAL CAMERA

(75) Inventors: Masahito Niikawa, Sakai (JP); Hiroaki Kubo, Mukou (JP)

(73) Assignee: Minolta Co., Ltd., Osada (JP)

( * ) Notice: Subject to any disclaimer, the term of this patent is extended or adjusted under 35 U.S.C. 154(b) by 0 days.

(21) Appl. No.: 09/337,235

(22) Filed: Jun. 22, 1999

(30) Foreign Application Priority Data

Jun. 26, 1998 (JP) .......................................... 10-180946

(51) Int. Cl.$^7$ ........................ H04N 5/225; H04N 5/232
(52) U.S. Cl. ........................ 348/340; 348/335; 348/347
(58) Field of Search ................................. 348/335, 347, 348/345, 340, 366, 208.1, 64; 396/79, 429, 73, 74, 71, 257

(56) References Cited

U.S. PATENT DOCUMENTS

| | | | | |
|---|---|---|---|---|
| 4,998,127 A | * | 3/1991 | Bell | 396/429 |
| 5,561,462 A | * | 10/1996 | Nagano | 348/223.1 |
| 5,587,766 A | * | 12/1996 | Kawamura et al. | 348/340 |
| 5,608,457 A | * | 3/1997 | Tohyama et al. | 348/335 |
| 5,612,738 A | * | 3/1997 | Kim | 348/223.1 |
| 5,963,376 A | * | 10/1999 | Togino | 359/676 |
| 5,983,029 A | * | 11/1999 | Yamada et al. | 396/51 |
| 6,091,900 A | * | 7/2000 | Kaneda et al. | 348/208.1 |
| 6,426,777 B1 | * | 7/2002 | Sato | 348/64 |
| 6,445,416 B1 | * | 9/2002 | Kyuma et al. | 348/358 |

FOREIGN PATENT DOCUMENTS

| | | | | |
|---|---|---|---|---|
| JP | 01113712 A | * | 5/1989 | G02B/7/105 |
| JP | 06-169428 | * | 6/1994 | H04N/5/238 |
| JP | 09-113816 | | 5/1997 | |
| JP | 09-325266 | | 12/1997 | |

* cited by examiner

Primary Examiner—Wendy R. Garber
Assistant Examiner—Lin Ye
(74) Attorney, Agent, or Firm—Sidley Austin Brown & Wood LLP (57) ABSTRACT

A digital camera which uses the resources of silver halide single lens reflex cameras to provide an angle of field equal to that of a silver halide single lens reflex camera without enlarging the size of the image sensing element, and which provides excellent holding characteristics because the camera body is not elongated in the backward direction. A taking lens for a silver halide single lens reflex camera is used as a taking lens 301. A digital camera provided with a reducing lens 302 disposed behind a taking lens in the direction of the optical axis of the taking lens and on the optical axis of the taking lens, and a CCD sensor 303 for photoelectrically converting an optical image transmitted through the taking lens and the reducing lens, and which is disposed at the composite focus point of the taking lens and the reducing lens. This construction ensures the field angle is identical to that of a silver halide single lens reflex camera even when a small size image sensing element is used. The camera body is also compact.

11 Claims, 7 Drawing Sheets

DIGITAL CAMERA

This application is based on application No. 10-180946 filed in Japan, the content of which is hereby incorporated by reference.

BACKGROUND OF THE INVENTION

1. Field of the Invention

The present invention relates to a digital camera using a taking lens used by cameras using media of different sizes and image sensing elements such as a CCD and the like, and specifically relates to a digital camera using a taking lens for cameras using silver halide film.

2. Description of the Related Art

In recent years, digital cameras have become popular replacements for cameras which use silver halide film in conjunction with advances in semiconductor and image processing arts. Such digital cameras basically take an optical image from a taking lens and subject the image to photoelectric conversion via image sensing element such as a charge-coupled device (CCD) or the like, subject the converted output data to image processing, and store the image data on a storage medium such as a memory card or the like.

A digital camera which makes practical use of the assets of the silver halide single lens reflex camera has been proposed during the popularization of the digital camera. This camera provides the body of a silver halide camera comprising a magazine at one end in the film length direction, compartment for the power source batteries E1–E4 at the opposite end, and a grip G, used directly as a camera body 2, as shown in FIGS. 8 and 9.

This camera is provided with a shutter button 9 on the top surface of the grip G of the camera body 2 provided with a viewfinder 3; a taking lens 301 for a single lens reflex camera is installed on the front mount 25, a quick return mirror M1 and focal plane shutter 26 and the like are provided behind the taking lens 301 in the optical axis direction, and a CCD 303 is disposed at a position on the optical axis near the film gate 29.

Figure 9:
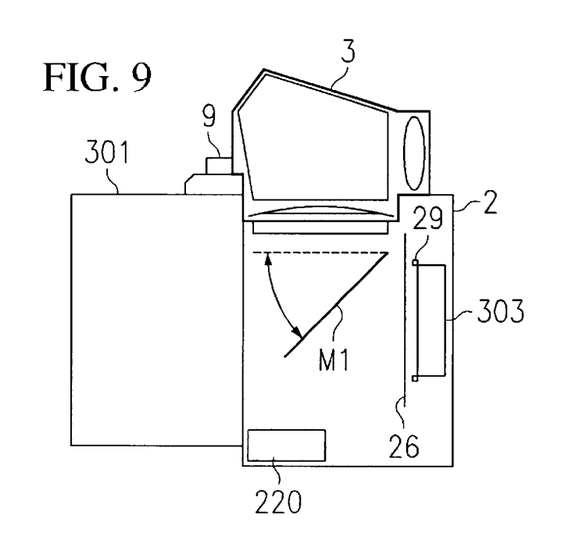
FIG. 9 is a side sectional view of thew conventional digital camera of FIG. 8.

When the shutter button 9 is pressed, the quick return mirror M1 is rotated to the dashed line position in FIG. 9 so as to be retracted from the photographic optical path, and directly thereafter the focal plane shutter 26 is opened, the object image viewed through the finder 3 forms an image on the CCD 303, and the CCD 303 converts this image to an optical image via photoelectric conversion. The focus point of the taking lens 301 is automatically focused by an auto focus (AF) actuator 220 provided at a suitable location within the camera body 2.

Figure 8:
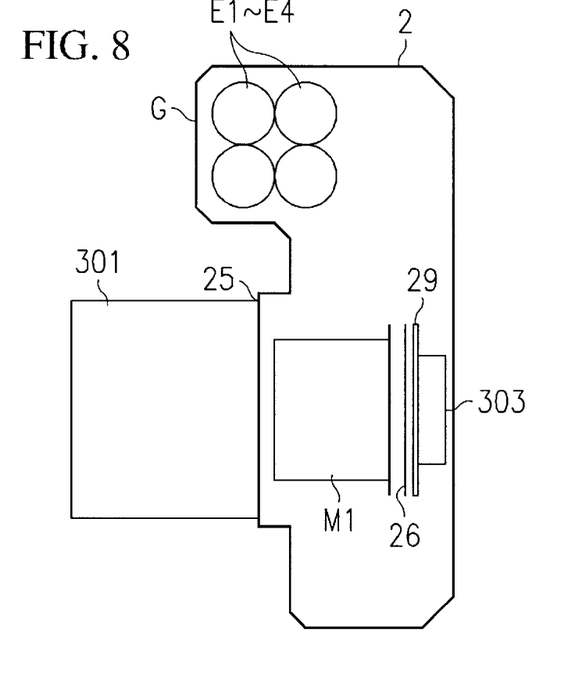
FIG. 8 is a top plan sectional view of a conventional digital camera with a silver halide single lens reflex camera taking lens installed.

As mentioned above, when a CCD receives light using a taking lens 301 of the silver halide single lens reflex camera, the size of the CCD and the size of the silver halide film must be equal, as shown in FIG. 8, to ensure the same field angle as the silver halide single lens reflex camera. A large CCD 303 equivalent to the aforesaid film is difficult to manufacture and produces an extremely poor yield in the current state of the art. Conversely, when a conventional small CCD 303, such as a ½ inch size, is used, the field angle is reduced because light only reaches the center area of the film frame, and an adequately wide angle photograph cannot be obtained.

To eliminate this disadvantage, it has been proposed to remove the back cover of the silver halide single lens reflex camera, and arrange the CCD 303 through a relay lens behind the focus point of the taking lens 301. According to this construction, an image formed at a certain position on conventional film is relayed via the relay lens, and reduced to a size matching the size of the CCD so as to form an image on the CCD.

In this construction, however, the camera body is elongated in the back, so as to make it extremely difficult to hold the camera, and increasing the susceptibility to so-called camera vibration and the like.

SUMMARY OF THE INVENTION

In view of the aforesaid information, an object of the present invention is to provide a digital camera that does not increase the size of the camera body even when constructed using a small type image sensing element.

These objects are attained by the digital camera of the present invention which uses the taking lens for a silver halide camera, comprises an optical system disposed between an install position of the taking lens and a focal plane of the taking lens; and an image sensing element disposed at a composite focus plane of the taking lens and the optical system.

Another digital camera of the present invention comprises: a mount on which exchangeable taking lens is installed; an optical system disposed between the mount and a focal plane of the taking lens; and an image sensing element disposed at a composite focus plane of the taking lens and the optical system.

BRIEF DESCRIPTION OF THE DRAWINGS

These and other objects and features of this invention will become clear from the following description, taken in conjunction with the preferred embodiments with reference to the accompanied drawings in which.

DETAILED DESCRIPTION OF THE PREFERRED EMBODIMENTS

Figure 1:
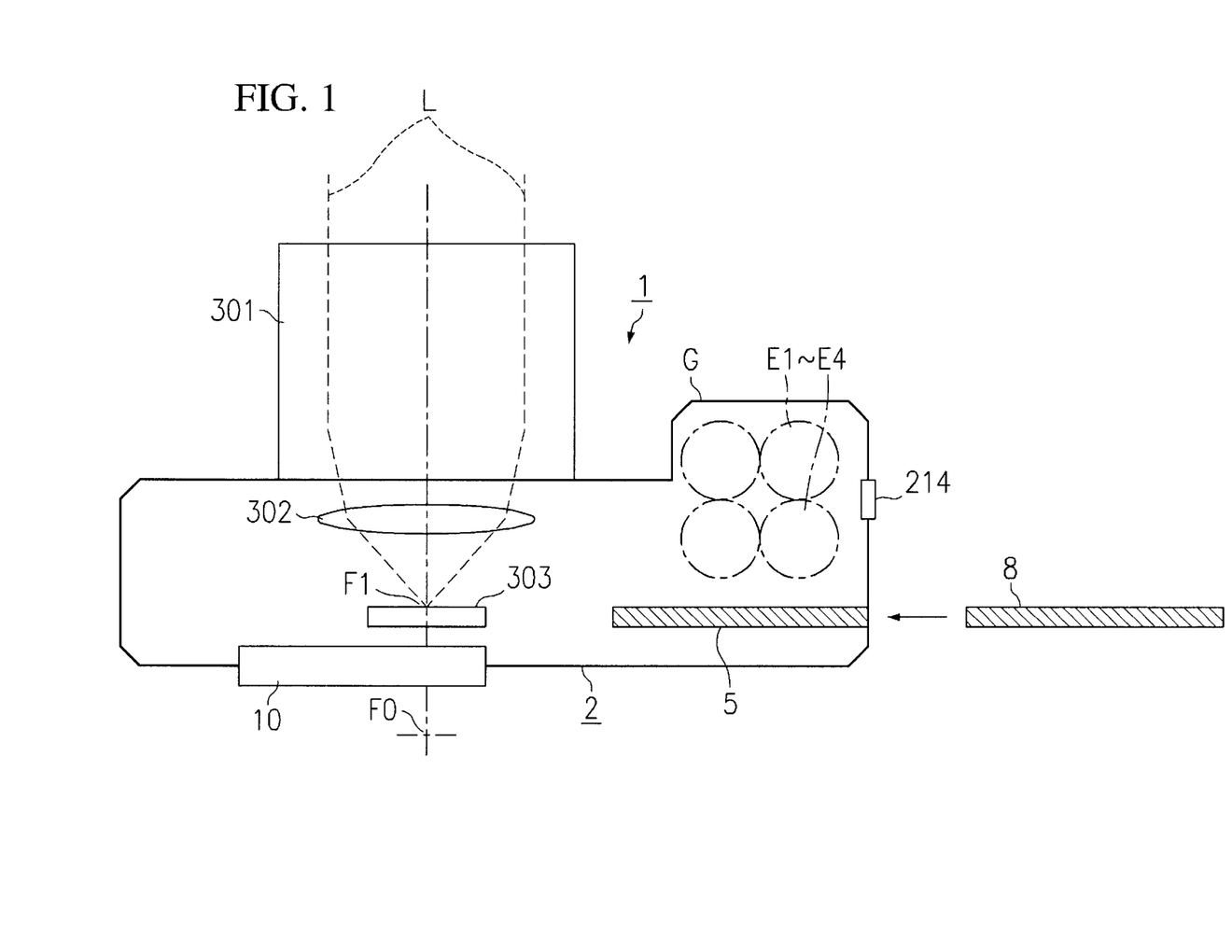
FIG. 1 is a is a top plan sectional view of a digital camera of an embodiment of the present invention.
Figure 2:
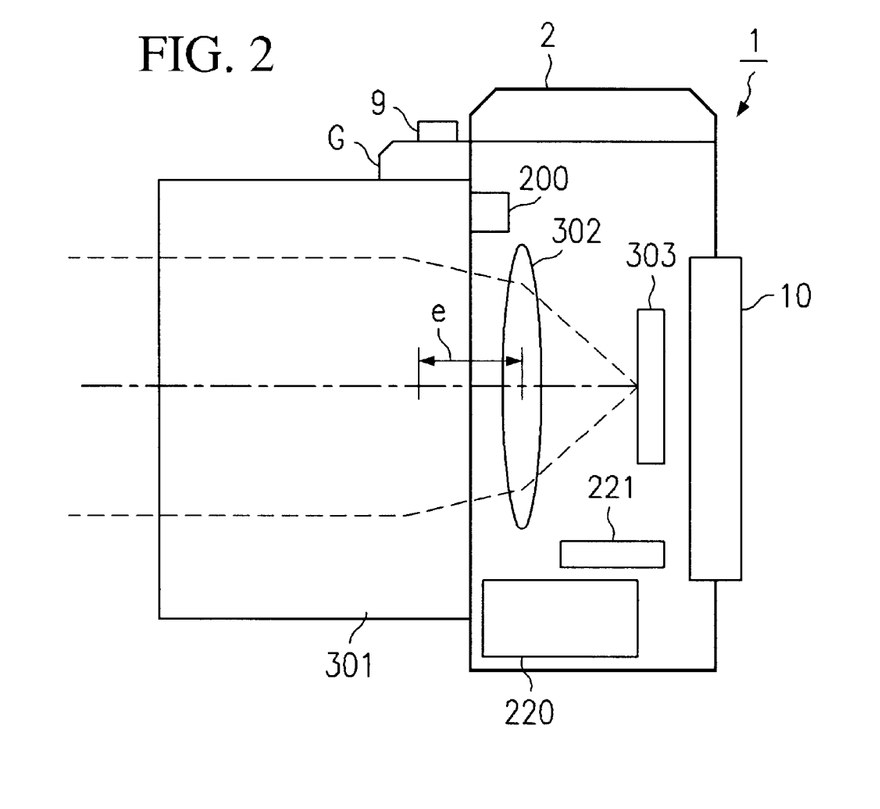
FIG. 2 is a side sectional view of the digital camera.
Figure 3:
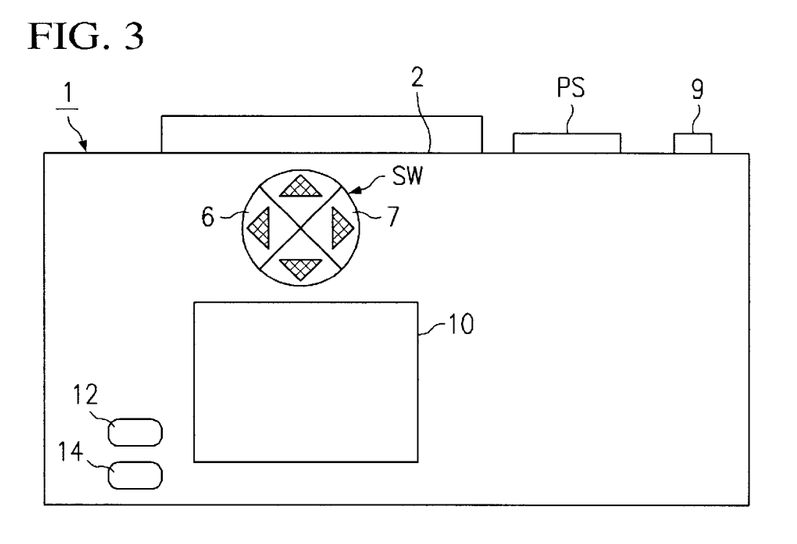
FIG. 3 is a rear view of the digital camera.

A digital camera 1 has an oblong box-like camera body 2, and a taking lens 301, which is a replaceable lens for a silver halide single lens reflex camera, is mounted on a lens mount, as shown in FIGS. 1–3.

The taking lens for the silver halide single lens reflex camera normally has a flange back set at approximately 40 mm, such that the incident light rays L focus on the focus point F0 position in FIG. 1.

Within the camera body 2, a reducing lens 302 is provided as a reduction optical unit arranged behind the taking lens 301 in the optical axis direction on the same optical axis as the taking lens 301. The composite focus point of both the taking lens 301 and the reducing lens 302 is at position F1 on the taking lens side from the position F0, and a image sensing element CCD sensor 303 is disposed at this position F1. Accordingly, the thickness of the camera body 2 in the direction of the optical axis is thinner than that of a silver halide single lens reflex camera, and the camera body 2 is formed as a thin body in the present embodiment. An actuator 220 for driving the taking lens 301 is arranged in the bottom part of the camera body 2.

The image frame size of the CCD 303 is 18×12 mm horizontal-by-vertical, and the number of pixels is 1800× 1200=2,160,000 pixels. When a standard lens having a focal length of 50 mm is used as the taking lens 301 and the composite focal length fc of the taking lens 301 and the reducing lens 302 is not 25 mm, a field angle equivalent to the field angle of a silver halide single lens reflex camera cannot be obtained. If the focal length of the taking lens 301 is designated f1, the distance between the taking lens 301 and the reducing lens 302 is designated e, and the focal length of the reducing lens is designated f2, the Equation (1) below obtains.

$$fc = f1 \cdot f2 / (f1 + f2 - e) \quad (1)$$

In this example, the distance e between the lenses 301 and 302 is 30 mm, and the focal length f2 of the reducing lens is set at 20 mm.

In this way, for example, the field angle when photographing using a taking lens 301 with a focal length of 50 mm mounted on the camera body of a silver halide single lens reflex camera matches the field angle when photographing using the taking lens installed on the camera body 2 of the present embodiment. Accordingly, a user may use the camera without the requirement of considering conversion of the focal length of the taking lens.

In general, the following equation (2) must be satisfied to match the field angle when using a taking lens installed on the camera body of a silver halide single lens reflex camera with the field angle when the lens is installed on the camera body 2 provided with a reducing lens as in the present embodiment using a CCD sensor 303 which is 1/n the size of 1 frame of the silver halide film.

$$e = f1 - (n-1) \cdot f2 \quad (2)$$

When using a reducing lens 302 and a CCD sensor 303 of the size in the present embodiment, and when the taking lens 301 is a telephoto lens having a focal length f1=135 mm, the values n=2, f2=20 mm, and e=115 mm.

There are also instances where the value e cannot be set to a value determined by equation (2) depending on the type of taking lens 301. In such instances, the position of the reducing lens 302 is moved forward or back to set the value e at a value determined by equation (2).

In order to determine the type of taking lens 301 installed in the camera body 2 of the digital camera shown in FIGS. 1–3, a contact 200 is provided within the camera body 2 for reading information in a ROM 201 installed in the taking lens 301, such that the type of installed taking lens 301 is determined via this ROM 201, and the actuator 221 for moving the reducing lens is driven in accordance with this information so as to move the reducing lens 302 in a forward or backward direction.

A liquid crystal display (LCD) 10 is provided on the back side of the camera body 2. The LCD 10 is used as a viewfinder to monitor photography and to display a regeneration of the recorded image.

On the bottom part of the left rear surface of the camera body 2 are provided a compression ratio setting slide switch 12 for switching the compression ratio K of the image data recorded on a memory card 8, and a photography/regeneration mode setting switch 14 for switching between the photography mode and the regeneration mode. The digital camera 1 allows selection of two compression ratios K, i.e., 1/8 and 1/20; for example, the compression ratio K is set at 1/8 when the compression ratio setting switch 12 is moved to the right side, and the compression ratio K is set at 1/20 when the switch 12 is moved to the left side. Of course, increasing or decreasing the types of compression ratios K is optional.

The photography mode is a mode for photographing, i.e., recording, and the regeneration mode is a mode for regenerating and displaying the photographed image stored on the memory card 8 on the LCD display 10. The photography/regeneration mode setting switch 14 is also a two-contact sliding switch; for example, the regeneration mode is set when the switch 14 is moved to the right, and the photography mode is set when the switch 14 is moved to the left.

Four-linked press button switches SW are provided above the LCD display 10. The lateral two button 6 and 7 allocate the frame advance functions to regenerate a recorded image. The switch 6 advances the frame of the recorded images in the direction of increasing frame number (photographic order direction) (hereinafter referred to as the "UP key"), and the other switch 7 advances the frame of the recorded images in the direction of decreasing frame number (hereinafter referred to as the "DOWN key").

A power switch PS comprising a rotary switch is provided on the top surface of the camera body 2, and a shutter button 9 is provided on the top of the grip G. An autofocus (AF) actuator 220 for driving the taking lens 301, and an actuator 221 for driving the reducing lens 302 are respectively provided on the bottom surface of the camera body 2.

The interior of the grip G forms a battery compartment, which accommodates, for example, AA-size dry cell batteries E1–E4 as a power source to drive the various components.

On one side of the camera body 2 is formed a slot 5 into which can be removably inserted a memory card 8 as an example of a recording medium for recording photographed images. In the vicinity of the slot 5 is provided a connector 214 for electrically connecting the digital camera 1 to an external personal computer 19 (refer to FIG. 4).

Figure 4:
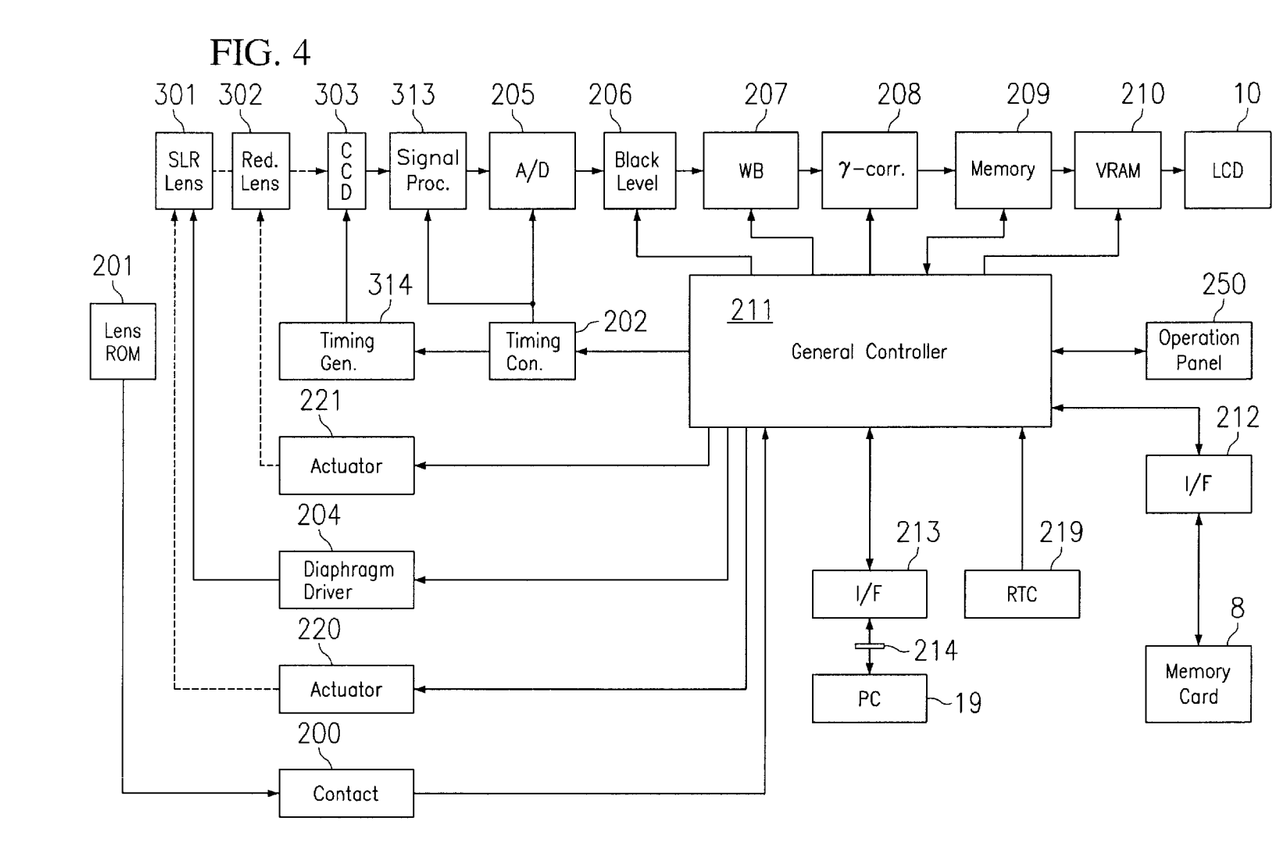
FIG. 4 is a block diagram of the control system of the digital camera of FIGS. 1–3.

FIG. 4 is a block diagram of the control system of the digital camera 1.

The CCD 303 is a color area sensor, which photoelectrically converts an optical image of an object formed by the taking lens 301 and the reducing lens 302 into signals comprising a signal array of image signals received by each pixel, and outputs these signals as image signals of the color components red (R), blue (B), and green (G) via color filters arranged in a specific pattern. A timing generator 314 generates various timing pulses for controlling the actuation of the CCD 303. The timing generator 314 generates signals for controlling the operation of the CCD 303 based on standard clock signals transmitted from a dining control circuit 202. For example, the dining generator 314 generates integration start/end (exposure start/end) timing signals, and clock signals for the read control signals (horizontal synchronization signal, vertical synchronization signal, transmission signal and the like) for reading the photoreception signals of each pixel, and outputs these signals to the CCD 303.

A signal processing circuit 313 performs predetermined analog signal processing of image signals (analog signals) output from the CCD 303. The signal processing circuit 313 has a correlation double sampling (CDS) circuit, and an auto gain control (AGC) circuit, so as to reduce the noise of the image signals via the CDS circuit, and adjust the level of the image signals by adjusting the gain of the ACG circuit.

An analog-to-digital (A/D) converter 205 converts each pixel signal of the image signal to a 10-bit digital signal. The A/D converter 205 converts each pixel signal (analog signal) to a 10-bit digital signal based on the A/D conversion clock signal input from the timing control circuit 202.

A black level correction circuit 206 corrects the lowest level included in the A/D converted pixel signals (hereinafter referred to as "pixel data") to a standard black level. A white balance circuit (hereinafter referred to as "WB circuit") 207 converts the level of the pixel data of each R, G, B color component so as to adjust the white balance after gamma correction. The WB circuit 207 converts the level of the pixel data of each R, G, B color component using a level conversion table stored in the general controller 211. The conversion coefficient (characteristics slope) of each color component of the level conversion table is set for each photographic image by the general controller 211.

The gamma correction circuit 208 corrects the gamma characteristics of the pixel data. The gamma correction circuit 208 has, for example, six types of gamma correction tables of different gamma characteristics, and performs gamma correction on pixel data via a specific gamma correction table in accordance with the photographic scene and photographic conditions.

An image memory 209 stores the pixel data output from the gamma correction circuit 208. The image memory 209 has a storage capacity of one frame. That is, the image memory 209 has a pixel data storage capacity equal to that of the CCD 303, i.e., 1200×1800=2,160,000 pixels, and stores the pixel data at a corresponding pixel position.

A VRAM 210 is a buffer memory for image data regenerated for display on the LCD display 10. The VRAM 210 has a pixel data storage capacity corresponding to the number of pixels of the LCD display 10.

In the photographic standby state, the pixel data of an image sensed 30 times per second by the CCD 303 are subjected to predetermined signal processing by each circuit from the A/D converter 205 to the gamma correction circuit 208, and thereafter the image data are stored in the image memory 209, and subjected to reduction processing in accordance with the number of pixels of the LCD display 10 via the general controller 211, then transmitted to the VRAM 210 for display on the LCD display 10. In this way, the photographer is able to view the object image via the image displayed on the LCD display 10. In the regeneration mode, an image read from the memory card 8 is subjected to predetermined signal processing by the general controller 211, and thereafter transmitted to the VRAM 210 for regeneration and display on the LCD display 10.

At this time, the general controller 211 discriminates the contrast of the center area of the image data stored in the image memory 209, and controls the AF actuator 220 to maximize the contrast, and maintain the focused state.

Reference number 204 refers to a diaphragm control driver, which controls the values that set the diaphragm value of the taking lens 301 via instruction from the general controller 211.

The general controller 211 discriminates the type of taking lens 301 by referencing information recorded in ROM within the taking lens 301 via the contact 200. In this way, the reducing lens 302 is moved to a predetermined position via a moving mechanism not shown in the drawing by referring to a corresponding table within the general controller 211 to chive the reducing lens actuator 221. This operation is performed again when the taking lens 301 is exchanged. The aforesaid table is a table of correspondence between the type of taking lens 301 and the aforesaid value e.

The card I/F 212 is an interface for writing image data to and reading image data from the memory card 8. The communications I/F 213 is a standard USB interface for connecting to a personal computer 19 to enable communications.

The RTC 219 is a clock circuit for managing the photograph date, and is driven by a separate power source not shown in the drawing.

The operation panel 250 is an input/output device for the general controller 211, and comprises the UP key 6, the DOWN key 7, the shutter button 9, the power switch PS, the compression setting switch 12, and the photography/regeneration mode setting switch 14.

The general controller 211 is a microcomputer, which organically controls the actuation of various components within the camera body 2 and the image sensing unit 3, and performs the general controls of the photographic operations of the digital camera 1.

The general controller 211 is provided with a filter unit for filtering processes, a recording image generator for generating thumbnail images and compressed images for accomplishing photographic image recording processing, and a regenerated image generator for generating a regenerated image of an image recorded in the memory card 8 for display on the LCD display 10.

The filter unit corrects image quality related to contours by correcting the high frequency components to be recorded via a digital filter. The filter unit is provided with a total of five digital filters including a digital filter for standard contour correction, two types of digital filters for strengthening contours relative to the standard contour correction, and two types of digital filters for weakening contours relative to the standard contour correction, these filters operating at compression ratios K of 1/8 and 12/20.

The recording image generator reads the image data from the image memory 209, and generates a thumbnail image and compression image to be recorded on the memory card 8. The recording image generator reads the pixel data at constant intervals in both the horizontal direction and the vertical direction while scanning the image memory 209 in the raster scan direction, and generates thumbnail images and records these images on the memory card 8 by sequentially transmitting the image data to the memory card 8.

The recording image generator reads all image data from the image memory 209, generates compressed image data by two-dimensional DCT conversion of pixel data, which are then subjected to predetermined compression processing by a JPEG method such as Huffman coding or the like, and records the compressed image data in the present image area of the memory card 8.

In the photographic mode, when the shutter button 9 is operated to specify a photograph, the general controller 211 thereafter generates a thumbnail image retrieved from the image memory 209, and generates a compressed image compressed by a JPEG method via the compression ratio K set by the compression setting switch 12, and both images are recorded on the memory card 8 together with tag information (frame number, exposure value, shutter speed, compression ratio K, date, scene information, and image discrimination results) relating to the photographic image.

When the memory card 8 has a capacity of 64 MB, it is capable of storing the images of approximately 200 frames at a compression ratio of 1/20; the tag data, high resolution image data compressed by a JPEG method (1800×1200 pixels), and thumbnail display image data (90×60 pixels) are recorded for each frame. For example, the aforesaid information is managed as EXIF type image files in frame units.

The digital camera 1 of this construction makes practical use of available resources because it is capable of using the taking lens 301 of a silver halide single lens reflex camera. In particular, the focal length is reduced because a reducing lens 302 is arranged behind the taking lens 301 a short distance from the flange back, and the CCD 303 is arranged at the composite focus point of the reducing lens 302 and the taking lens 301, and the use of a small size CCD 303 ensures the same field angle as a silver halide camera, and does not hinder wide angle photography. The disposition of the CCD 303 not only does not require elongation of the rear side of the camera body 2, it actually makes the body thinner and more compact, and improves the holding characteristics of the camera.

Figure 5:
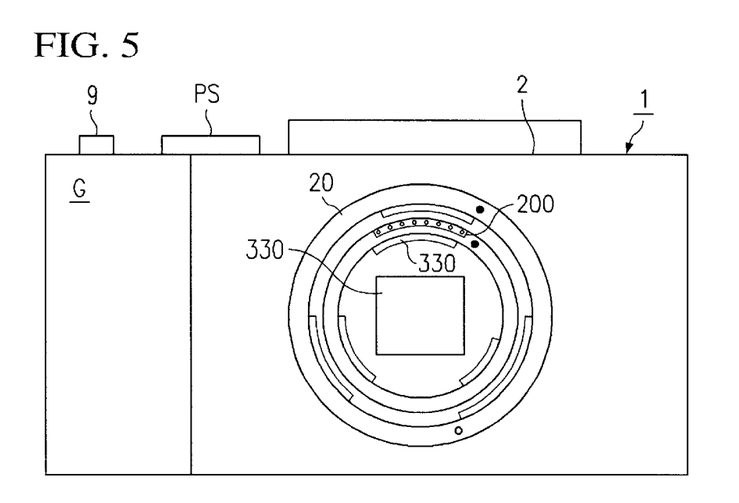
FIG. 5 is a front view of a digital camera of another embodiment of the present invention shown with the reducing lens removed.

FIG. 5 shows another embodiment of the present invention; parts common to FIGS. 1–3 at equivalent locations are omitted from this description.

In FIG. 5, the reducing lens 302 is replaceable in accordance with the taking lens 301 rather than moving the reducing lens 302 in accordance with the taking lens 301.

Figure 6:
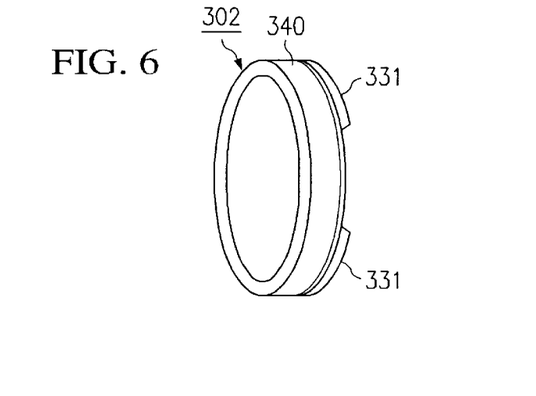
FIG. 6 is a perspective view of the reducing lens of the digital camera of FIG. 5.
Figure 7:
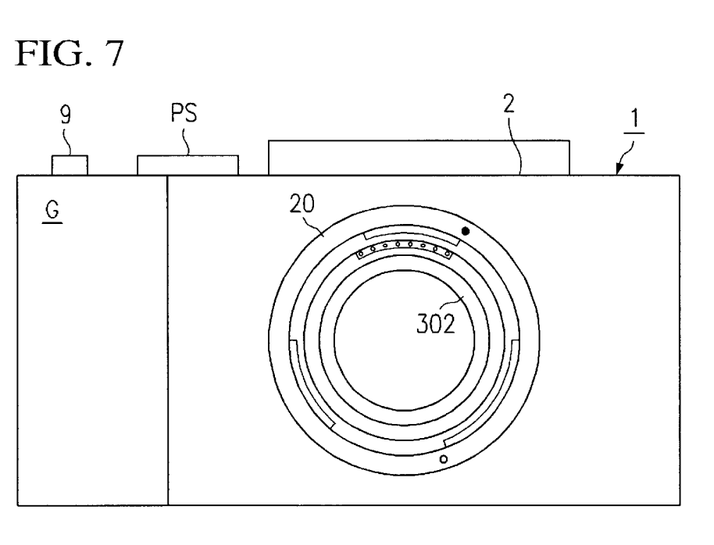
FIG. 7 is a front view of the digital camera of FIG. 5 shown with the reducing lens installed.

Specifically, three bayonet members 331 are arranged in a circumferential direction on the barrel 340 of the reducing lens 302, as shown in FIG. 6, so as to render the reducing lens 302 detachably installable on the camera body 2 by the removable engagement of the bayonet members 331 with the mount 330 for the reducing lens 302 provided on the interior side of the mount 20 of the taking lens 301. FIG. 7 shows the reducing lens 302 installed on the camera body 2.

In this way, an object image is suitably formed on the CCD 303 in accordance with the individual taking lens 301. When the reducing lens 302 is removed, the taking lens 301 can be installed on the camera body 2 via a well known close-up ring so as to be usable for photography without the reducing lens 302. In this instance, when the reducing lens 302 is removed and the taking lens 301 is installed, an image is not formed on the CCD because the focus point is F0. For this reason, installing the taking lens via the close-up ring allows the entire taking lens to feed out in a forward direction, so as to form the focus point on the CCD.

The use of a taking lens for a silver halide single lens reflex camera and a digital camera reducing lens 302 allows photographs to be taken at the same field angle as the taking lens of the silver halide single lens reflex camera. It is also possible to take photographs with the taking lens installed via a close-up ring without installing the reducing lens 302, in which case the CCD sensor senses a trimmed image because only the center area of the image is received, so as to simulate the use of a long focus lens. Accordingly, this arrangement advantageously allows a single replaceable lens to be used two ways.

This construction can also provide a warning when a taking lens 301 is installed which is inappropriate relative to the installed reducing lens 302. In this instance, the type of reducing lens 302 can be discriminated by means of a marking or the like provided on the reducing lens 302.

Although each of the embodiments has been described in terms of the use of a single reducing lens 302, it is to be understood that a plurality of such reducing lenses 302 may be used.

Obviously, many modifications and variation of the present invention are possible in light of the above teachings. It is therefore to be understood that within the scope of the appended claims, the invention may be practiced other than as specifically described.

What is claimed is:

1. A digital camera which uses a taking lens for a camera for use with a silver halide film, comprising:

an optical system removably disposed between an install position of the taking lens and a focal plane of the taking lens; and an image sensing element disposed at a composite focus plane of the taking lens and the optical system.

2. A digital camera according to claim 1, wherein said optical system includes a reduction optical system.

3. A digital camera according to claim 1, wherein a focal length of the optical system and a distance between the taking lens and the optical system are set so that a relationship between the composite focal length and a field angle of the image sensing element equals a relationship between the focal length of the taking lens and a field angle of the silver halide film.

4. A digital camera comprising:

a mount on which a removable reduction optical system can be is installed; and an image sensing element disposed at a composite focus plane of the reduction optical system and a taking lens which is positioned in front of the reduction optical system.

5. A digital camera according to claim 4, wherein the taking lens is an exchangeable taking lens for a camera using silver halide film.

6. A digital camera according to claim 5, wherein a focal length of the optical system and a distance between the taking lens and the optical system are set so that a relationship between the composite focal length and a field angle of the image sensing element equals a relationship between the focal length of the taking lens and a field angle of the silver halide film.

7. An image sensing method for a digital camera, comprising the following steps:

reducing, by a removable reduction optical system, an image transmitted through an exchangeable taking lens;

forming a reduced image on an image sensing element; and generating image data based on an output of the image sensing element.

8. A digital camera according to claim 1, wherein the taking lens is installable to the digital camera with a close-up ring in place of the optical system.

9. A digital camera according to claim 1, wherein a warning is provided when the taking lens is inappropriate for the optical system.

10. A digital camera according to claim 5, wherein the taking lens is attachable to the digital camera with a close-up ring in place of the removable reduction optical system.

11. A digital camera according to claim 5, wherein a warning is provided when the taking lens is inappropriate for the reduction optical system.

* * * * *

UNITED STATES PATENT AND TRADEMARK OFFICE
CERTIFICATE OF CORRECTION

PATENT NO.    : 6,704,053 B1
DATED         : March 9, 2004
INVENTOR(S)   : Masahito Niikawa et al.

It is certified that error appears in the above-identified patent and that said Letters Patent is hereby corrected as shown below:

Title page,
After Item "[73] Assignee: Minolta Co., Ltd.," delete "Osada", and insert -- Osaka --.

Column 8,
Line 26, after "be", delete "is".

Signed and Sealed this

Third Day of August, 2004

JON W. DUDAS
*Acting Director of the United States Patent and Trademark Office*